United States Patent Office 3,388,130
Patented June 11, 1968

3,388,130
1-HYDRAZINO OR 1-AMINO ISOQUINOLINES
Marcel Pesson, Paris, France, assignor to Société Anonyme dite: Laboratoire Roger Bellon, Neuilly-sur-Seine, France, a French company
No Drawing. Filed Aug. 11, 1964, Ser. No. 388,957
Claims priority, application Great Britain, Aug. 20, 1963, 32,992/63
15 Claims. (Cl. 260—286)

ABSTRACT OF THE DISCLOSURE 1-hydrazino or 1-amino isoquinoline compounds which are substituted in 4-position by an ether group such as a lower alkoxy, phenoxy, or benzyloxy group and which may carry in 3-position lower alkyl, phenyl, or benzyl, and their pharmaceutically acceptable, non-toxic acid addition salts. The compounds are represented by the following formula

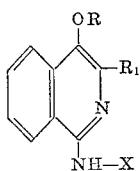

wherein X is hydrogen or the amino group, R is lower alkyl, phenyl, or benzyl, and $R_1$ is hydrogen, lower alkyl, phenyl, or benzyl. Such compounds possess noteworthy coronary and peripheral vasodilator or vasoconstrictor activity and, due to their high activity and low toxicity, a high therapeutic index.

The 1-hydrazino compounds are preferably prepared by heating the corresponding 1-chloro compounds with a large excess of hydrazine in the absence of a solvent, while the 1-amino compounds are obtained by hydrogenolysis of the 1-hydrazino compounds at room temperature and atmospheric presure. The yield is surprisingly high.

---

This invention relates to isoquinoline derivatives.

The invention provides, as new compounds, the 1-hydrazino and 1-amino isoquinolines of Formula I:

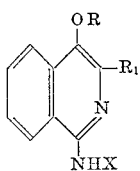

in which X represents hydrogen or an $NH_2$ group, R represents a straight or branched alkyl radical having at most 4 carbon atoms or an aryl, e.g. phenyl, or aralkyl, preferably benzyl, radical, and $R_1$ represents hydrogen or a straight or branched alkyl radical having at most 4 carbon atoms, or an aryl, preferably phenyl, or aralkyl e.g. benzyl radical. The new compounds may be used as the free bases or in the form of their acid addition salts.

The compounds of the present invention have interesting therapeutic properties, notably as coronary dilators, but also as hypotensive agents, as vaso-dilators and vasoconstrictors.

The invention includes within its scope pharmaceutical compositions containing one or more of the above-mentioned compounds, as such or as their non-toxic acid addition salts, in association with a pharmaceutically acceptable, non-toxic support.

According to an embodiment of the invention, the 1-hydrazine-4-alkoxyisoquinolines of Formula I are prepared by reacting a 1-chloroisoquinoline of Formula II:

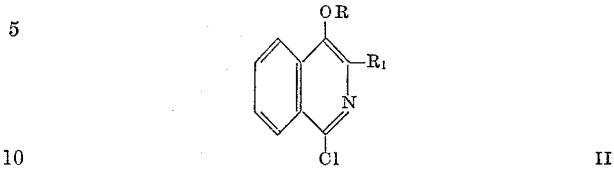

with a large excess of hydrazine in the absence of a solvent. The reaction is conveniently carried out in boiling hydrazine hydrate under reflux. If a solvent is used, the reaction does not yield 1-hydrazino-4-alkoxyisoquinolines, as shown in Example I below.

In accordance with a further embodiment of the invention, the 1-amino-isoquinolines of Formula I are prepared by hydrogenating the corresponding hydrazines in the presence of Raney nickel.

This method of preparation gives better results than the direct reaction of a 1-chloro-isoquinoline with ammonia, as the chlorine atoms of 1-chloro-isoquinolines are very resistant to ammonolysis with ammonia in a variety of forms (e.g. as liquid ammonia, or in an alcoholic or aqueous solution at high temperature). Moreover, the amination of 4-alkoxyisoquinolines by Chichibabin's reaction with potassium amide only gives 1-amino-isoquinolines in poor yields.

The following examples illustrate the invention.

Example I.—1-hydrazino-4-ethoxyisoquinoline 1-chloro-4-ethoxyisoquinoline is first prepared by the action of ethyl bromide on 1-chloro-4-hydroxyisoquinoline. In a single-necked spherical flash provided with a mechanical stirrer and a reflux condenser, there is heated under reflux for 4 hours with stirring a solution of 3.6 g. of 1-chloro-4-hydroxyisoquinoline in 2.6 g. of ethyl bromide in the presence of 4.2 g. of potassium carbonate. In the course of the heating, $2 \times 1.2$ g. of ethyl bromide are added to compensate for the losses due to evaporation. After cooling, the solution is filtered to separate the mineral salts, the filtrate is concentrated to dryness, and the solid residue is washed with a dilute sodium hydroxide solution and recrystallized from alcohol. The product melts at 109° C.

*Analysis.*—Calculated: C, 63.62%; H, 4.85%; N, 6.76%. Found: C, 63.66%; H, 4.97%; N, 6.65%.

5 g. of the 1-chloro-4-ethoxyisoquinoline previously obtained and 50 cc. of 98% hydrazine hydrate are heated under reflux for 5 hours. The solid which crystallizes on cooling is separated, washed with iced water, dried in vacuo over phosphoric acid, and then recrystallized from cyclohexane. Yield: 4.7 g. (96%), M.P. 130° C.

*Analysis.*—$C_{11}H_{13}N_3O$ (M.W. = 203.2). Calculated: C, 65.00%; H, 6.45%; N, 20.68%. Found: C, 65.23%; H, 6.76%; N, 20.87%.

The hydrochloride of this hydrazine melts at about 180° C. (with decomposition).

With benzaldehyde, this hydrazine gives a hydrazone melting at 169° C.

As has already been mentioned, the hydrazide cannot be obtained if the 1-chloro-4-ethoxyisoquinoline is heated under reflux with an excess of hydrazine hydrate (3 to 5 mol) in alcoholic solution, even if the heating is prolonged. If dimethylformamide or dimethylsulfoxide are used, they give results no better than those obtained with alcohol.

Example II.—1-hydrazino-4-methoxyisoquinoline

The procedure described in Example I is followed, 1-chloro-4-ethoxyisoquinoline being replaced by 1-chloro-4- methoxyisoquinoline. The final product recrystallized from cyclohexane melts at 133° C.

*Analysis.*—$C_{10}H_{11}N_3O$ (M.W.=189.2). Calculated: C, 63.47%; H, 5.86%; N, 22.21%. Found: C, 63.79%; H, 6.10%; N, 22.52%.

Its hydrochloride melts at about 175° C. (with decomposition).

Example III.—1-hydrazino-4-butoxyisoquinoline

The procedure described in Example I is followed, 1-chloro-4-ethoxyisoquinoline being replaced by 1-chloro-4-butoxyisoquinoline. The final product, recrystallized from cyclohexane, melts at 126° C. Yield: 97%.

*Analysis.*—$C_{13}H_{17}N_3O$ (M.W.=231.3). Calculated: C, 67.50%; H, 7.41%; N, 18.17%. Found: C, 67.38%; H, 7.70%; N, 17.82%.

Example IV.—1-hydrazino-3-phenyl-4-methoxyisoquinoline

The procedure described in Example I is followed, 1-chloro-4-ethoxyisoquinoline being replaced by 1-chloro-3-phenyl-4-methoxyisoquinoline. After recrystallization from cyclohexane, the final product melts at 160° C. Yield: 87%.

*Analysis.*—$C_{16}H_{15}N_3O$ (M.W.=265.3). Calculated: C, 72.43%; H, 5.70%; N, 15.84%. Found: C, 72.62%; H, 5.71%; N, 15.83%.

Its hydrochloride melts at about 190° C. (with decomposition).

1-chloro-3-phenyl-4-methoxyisoquinoline, which is the starting material, melts at 104° C. It is prepared by the action of phosphorus oxychloride on 1-hydroxy-3-phenyl-4-methoxyisoquinoline.

Example V.—1-hydrazino-4-benzyloxyisoquinoline

The procedure of Example I is followed, 1-chloro-4-benzyloxyisoquinoline being replaced by 1-chloro-4-ethoxyisoquinoline. After recrystallization from cyclohexane, the final product melts at 160° C. Yield: 93%.

*Analysis.*—$C_{16}H_{15}N_3O$ (M.W.=265.3). Calculated: C, 72.43%; H, 5.70%; N, 15.84%. Found: C, 72.70%; H, 5.73%; N, 15.73%.

Its hydrochloride melts at about 190° C. (with decomposition).

The 1-chloro-4-benzyloxyisoquinoline used as starting material was obtained by alkylation of 1-chloro-4-hydroxyisoquinoline with benzyl chloride in acetone in the presence of potassium carbonate. It melts at 103° C.

*Analysis.*—$C_{16}H_{12}ClNO$. Calculated: C, 71.24%; H, 4.48%; N, 5.19%. Found: C, 71.35%; H, 4.70%; N, 5.06%.

Example VI.—1-hydrazino-3-methyl-4-methoxyisoquinoline

The procedure of Example I is followed, but 1-chloro-3-methyl-4-methoxyisoquinoline is replaced by 1-chloro-4-ethoxyisoquinoline. Yield: 80%. The product melts at 142° C., after recrystallization from cyclohexane.

*Analysis.*—$C_{11}H_{13}N_3O$ (M.W.=203.2). Calculated: C, 65.00%; H, 6.45%; N, 20.68%. Found: C, 65.00%; H, 6.37%; N, 20.96%.

Its hydrochloride melts at about 150° C. (with decomposition).

Example VII.—1-hydrazino-3-butyl-4-ethoxyisoquinoline

The procedure of Example I is followed, but 1-chloro-4-ethoxyisoquinoline is replaced by 1-chloro-3-butyl-4-ethoxyisoquinoline. The product is obtained in a yield of 85%, M.P. 130° C., after recrystallization from cyclohexane.

*Analysis.*—$C_{15}H_{21}N_3O$ (M.W.=259.3). Calculated: C, 69.46%; H, 8.16%; N, 16.21%. Found: C, 69.66%; H, 8.26%; N, 16.00%.

Its hydrochloride melts at 130° C. with decomposition).

Example VIII.—1-amino-4-ethoxyisoquinoline 2 g. of 1-hydrazino-4-ethoxyisoquinoline in solution in 45 cc. of 90% alcohol are hydrogenated at atmospheric pressure and room temperature in the presence of 4 g. of Raney nickel until the absorption of hydrogen ceases. The solution is filtered and concentrated to dryness in vacuo. The crystalline residue is recrystallized from cyclohexane; yield: 1.6 g. (80%), M.P. 110° C.

*Analysis.*—$C_{11}H_{12}N_2O$ (M.W.=188.2). Calculated: C, 70.18%; H, 6.43%; N, 14.88%. Found: C, 69.98%; H, 6.39%; N, 14.80%.

As already stated, this amine cannot be obtained by ammonolysis of 1-chloro-4-ethoxyisoquinoline with ammonia. By the application of Chichibabin's reaction to 4-ethoxyisoquinoline, it was obtained only in a poor yield.

Example IX.—1-amino-4-butoxyisoquinoline

The procedure of Example VIII is followed, but 1-hydrazino-4-butoxyisoquinoline is replaced by 1-hydrazino-4-ethoxyisoquinoline. The amine obtained melts at 85° C. after recrystallization from cyclohexane.

*Analysis.*—$C_{23}H_{16}N_2O$ (M.W.=216.3). Calculated: C, 72.19%; H, 7.46%; N, 12.95%. Found: C, 71.85%; H, 7.60%; N, 12.84%.

The following table indicates the toxicities of the compounds described in Examples I to VIII in the form of their hydrochlorides.

| Example | $LD_{50}$ (intravenous route), mg./kg. | $LD_{50}$ (intraperitoneal route), mg./kg. |
| --- | --- | --- |
| I | 40 | 150 |
| II | 55 | |
| III | 54 | |
| IV | 5 | 25 |
| V | 50 | |
| VI | 60 | |
| VII | 70 | 110 |
| VIII | 33 | |

The compound of Example II (1-hydrazino-4-methoxyisoquinoline) shows an appreciable coronary-dilatory effect on the isolated heart. This action is demonstrated by using Langendorff's technique. In a concentration of $1 \times 10^{-6}$ in the perfusion liquid, the compound appreciably increases the coronary flow. The products of the other examples are also coronary-dilatory agents, but are less active except for the product of Example I (1-hydrazino-4-ethoxyisoquinoline).

The compounds of Examples I (1-hydrazino-4-ethoxyisoquinoline), II (1-hydrazino-4-methoxyisoquinoline), III (1-hydrazino-3-methyl-4-methoxyisoquinoline) are powerful peripheral vaso-dilators. This action can be demonstrated by the method of Binet and Burnstein. The vaso-dilatory effect is appreciable in doses as low as 0.5 mg./kg.

The compound of Example V, on the other hand, is a peripheral vaso-constrictor, the action of which is marked in a dosage as low as 1 mg./kg.

I claim:

1. The isoquinoline compound selected from the group consisting of a compound of the formula

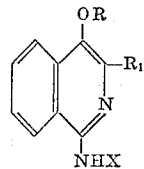

wherein

X is a member selected from the group consisting of hydrogen and the amino-group —$NH_2$;

R is a member selected from the group consisting of alkyl having 1 to 4 carbon atoms, phenyl, and benzyl; and $R_1$ is a member selected from the group consisting of hydrogen, alkyl having 1 to 4 carbon atoms, phenyl, and benzyl, and its non-toxic acid addition salts.

2. 1-hydrazino isoquinoline compound selected from the group consisting of a compound of the formula

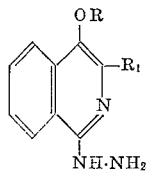

wherein

R is a member selected from the group consisting of alkyl having 1 to 4 carbon atoms and benzyl; and $R_1$ is a member selected from the group consisting of hydrogen, alkyl having 1 to 4 carbon atoms, and phenyl, and its non-toxic acid addition salts.

3. The 1-amino isoquinoline compound selected from the group consisting of a compound of the formula

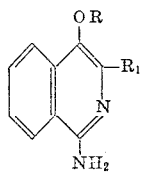

wherein

R is a member selected from the group consisting of alkyl having 1 to 4 carbon atoms and benzyl; and $R_1$ is a member selected from the group consisting of hydrogen, alkyl having 1 to 4 carbon atoms, and phenyl, and its non-toxic acid addition salts.

4. 1-hydrazino-4-ethoxyisoquinoline and its non-toxic acid addition salts.

5. 1-hydrazino-4-methoxyisoquinoline and its non-toxic acid addition salts.

6. 1-hydrazino-4-butoxyisoquinoline and its non-toxic acid addition salts.

7. 1 - hydrazino - 3-phenyl-4-methoxyisoquinoline and is non-toxic acid addition salts.

8. 1-hydrazino-4-benzyloxyisoquinoline and its non-toxic acid addition salts.

9. 1 - hydrazino - 3-methyl-4-methoxyisoquinoline and its non-toxic acid addition salts.

10. 1-hydrazino-3-butyl - 4 - ethoxyisoquinoline and its non-toxic acid addition salts.

11. 1-amino-4-ethoxyisoquinoline and its non-toxic acid addition salts.

12. 1-amino-4-butoxyisoquinoline and its non-toxic acid addition salts.

13. In a process of producing a 1-hydrazino isoquinoline compound of the formula

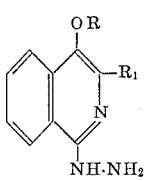

wherein

R is a member selected from the group consisting of alkyl having 1 to 4 carbon atoms, phenyl, and benzyl; and $R_1$ is a member selected from the group consisting of hydrogen, alkyl having 1 to 4 carbon atoms, phenyl, and benzyl, the step which comprises heating a 1-chloro isoquinoline compound of the formula

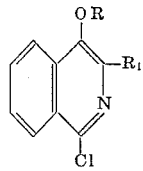

wherein

R and $R_1$ are the same members as indicated above, in the absence of a solvent with hydrazine in an amount of at least about ten times the amount of the 1-chloro isoquinoline compound until chlorine is replaced by the hydrazine group.

14. The process according to claim 13, wherein hydrazine hydrate is the hydrazine reactant and wherein the reactants are heated to boiling.

15. In a process of producing a 1-amino isoquinoline compound of the formula

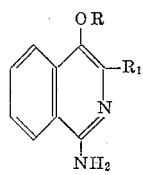

wherein

R is a member selected from the group consisting of alkyl having 1 to 4 carbon atoms, phenyl, and benzyl; and $R_1$ is a member selected from the group consisting of hydrogen, alkyl having 1 to 4 carbon atoms, phenyl, and benzyl, the step which comprises hydrogenating a 1-hydrazino isoquinoline compound of the formula

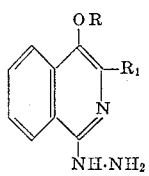

wherein

R and $R_1$ are the same members as indicated above, at room temperature and atmospheric pressure in the presence of Raney nickel catalyst until adsorption of hydrogen ceases.

References Cited

UNITED STATES PATENTS

| | | | |
|---|---|---|---|
| 2,700,040 | 1/1955 | Ullyot | 260—286 |
| 2,719,158 | 8/1955 | Druey | 260—286 |
| 3,272,824 | 9/1966 | Ebetino et al. | 260—286 |

OTHER REFERENCES

Elderfield, vol. IV, "Heterocyclic Chemistry," Wiley, 1952, pp. 283–5, 338.

ALEX MAZEL, *Primary Examiner.*

D. G. DAUS, *Assistant Examiner.*